United States Patent
Roberson

[11] Patent Number: 5,975,755
[45] Date of Patent: Nov. 2, 1999

[54] SHIELD FOR MOLTEN METAL IMMERSIBLE THERMOCOUPLE SUPPORT POLE

[75] Inventor: John H. Roberson, Birmingham, Ala.

[73] Assignee: Midwest Instrument Co., Inc., Hartland, Wis.

[21] Appl. No.: 08/950,423

[22] Filed: Oct. 15, 1997

[51] Int. Cl.⁶ ............................................. G01K 1/12
[52] U.S. Cl. .................... 374/140; 374/179; 266/88; 73/DIG. 9
[58] Field of Search .................. 374/140, 179; 266/88; 73/DIG. 9

[56] References Cited

U.S. PATENT DOCUMENTS

| | | | |
|---|---|---|---|
| 3,024,295 | 3/1962 | Moore | 374/140 |
| 3,357,250 | 12/1967 | Lowdermilk | 73/864.52 |
| 4,015,475 | 4/1977 | Pluschkell et al. | 374/140 |
| 4,229,230 | 10/1980 | Hance | 136/234 |
| 4,489,604 | 12/1984 | Kumbrant et al. | 374/140 |
| 4,721,534 | 1/1988 | Phillippi et al. | 374/179 |
| 4,762,571 | 8/1988 | Kaufman et al. | 136/234 |
| 4,863,283 | 9/1989 | Falk | 274/179 |
| 4,919,543 | 4/1990 | Davis et al. | 374/139 |
| 4,984,904 | 1/1991 | Nakano et al. | 374/140 |
| 5,184,894 | 2/1993 | Falk et al. | 374/140 |
| 5,360,269 | 11/1994 | Ogawa et al. | 374/140 |
| 5,447,373 | 9/1995 | Okuhara | 374/140 |
| 5,603,571 | 2/1997 | Eckert | 374/140 |

*Primary Examiner*—Randy W. Gibson
*Attorney, Agent, or Firm*—Ryan Kromholz & Manion

[57] ABSTRACT

A protective device for a support assembly for a thermocouple adapted for immersion into a molten metal bath to measure the temperature in the bath includes an elongated exterior protective tubular shield, preferably metallic. An interior spacing member is contained within or otherwise affixed to the shield. The spacing member may be in inset from the lower end of the shield to accommodate insertion of an end of a cardboard tube into the annular space between the pole and the shield. A thermocouple for measuring temperatures in a molten metal bath is affixed to the hollow cardboard tube. The shield may be provided with threaded holes, preferably also extending through the spacing member, to receive set screws so that the shield may be fixed at a desired location along the length of the pole.

9 Claims, 3 Drawing Sheets

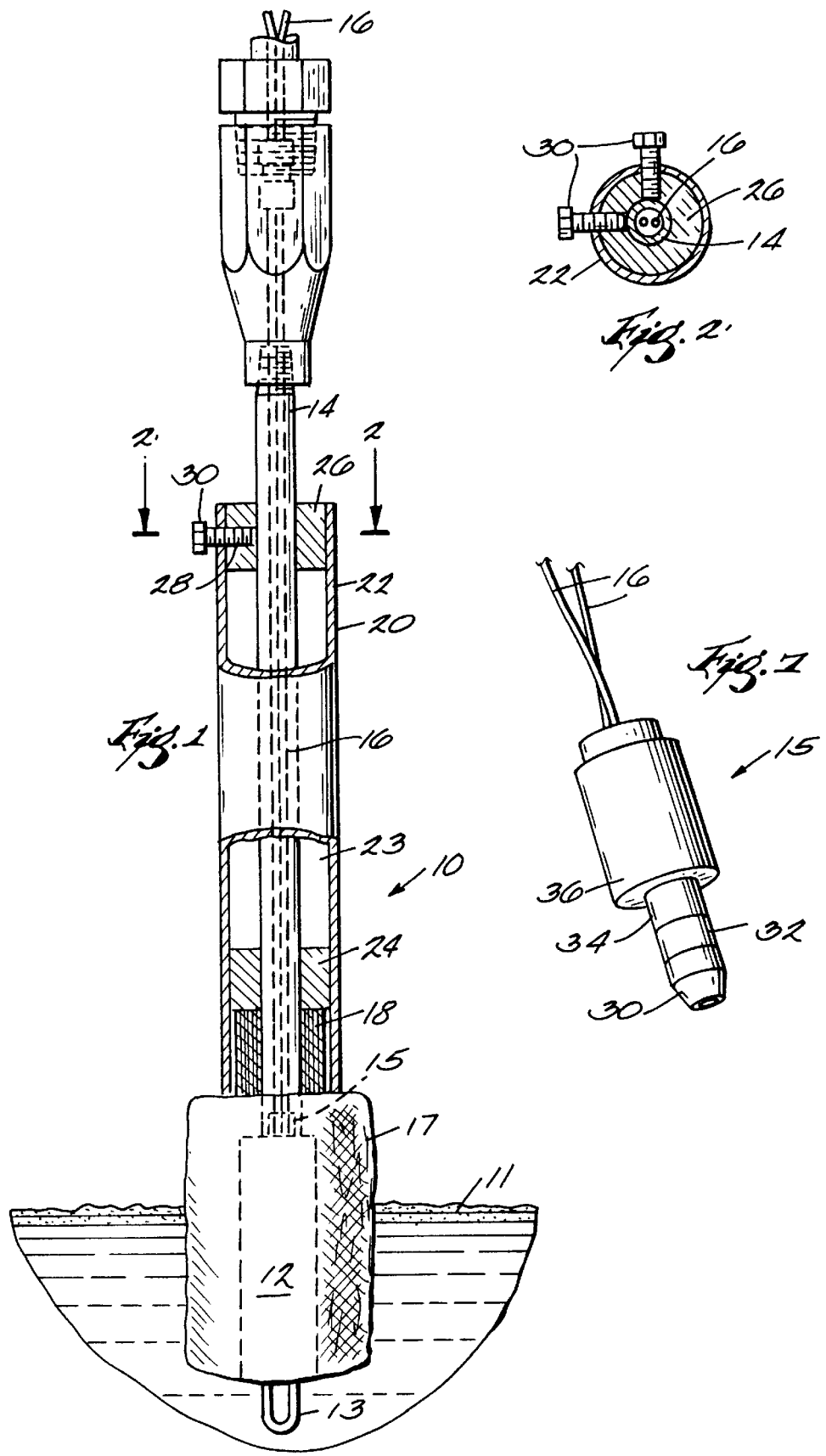

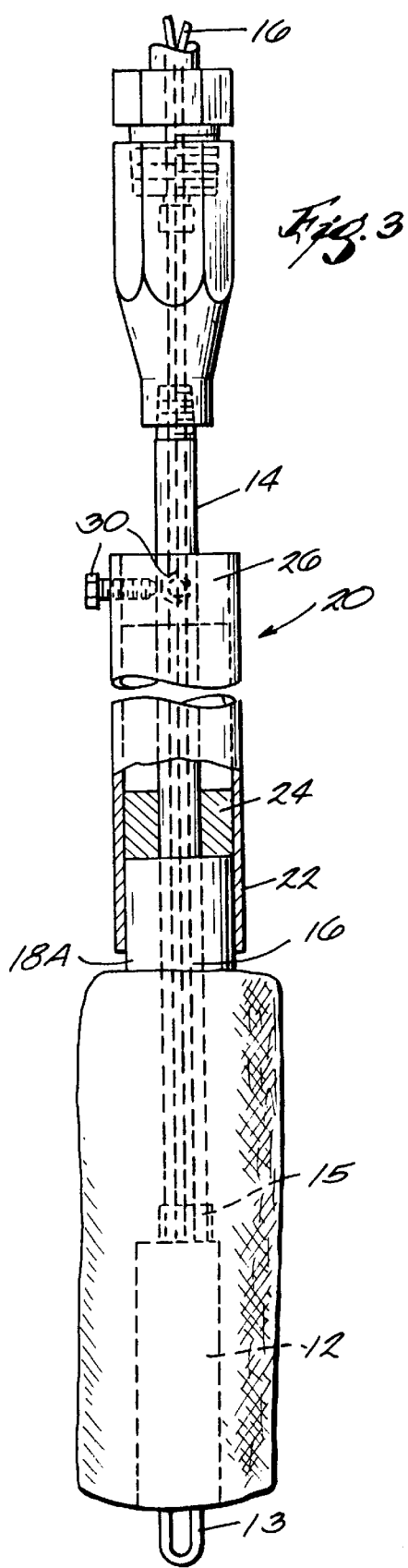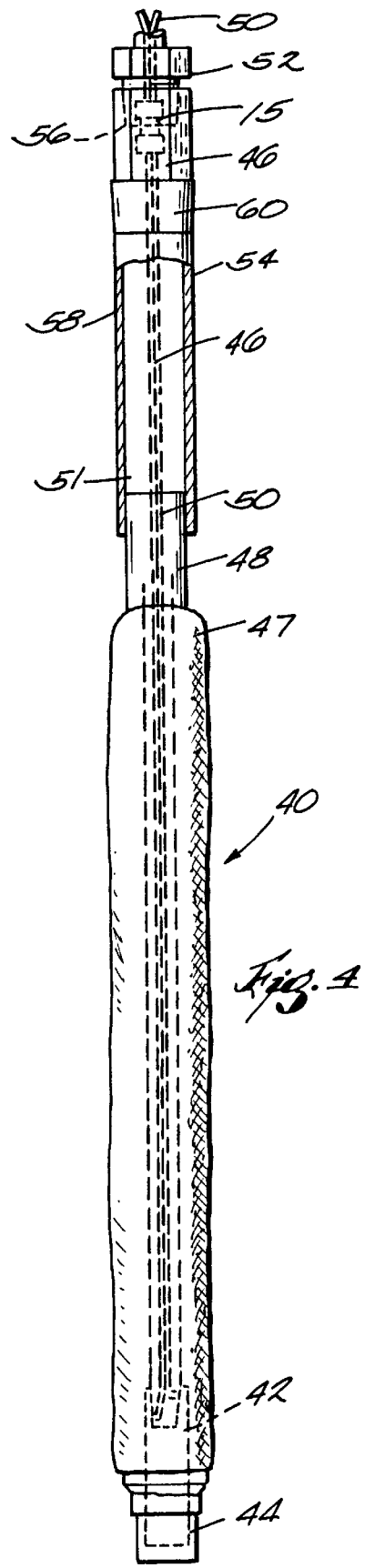

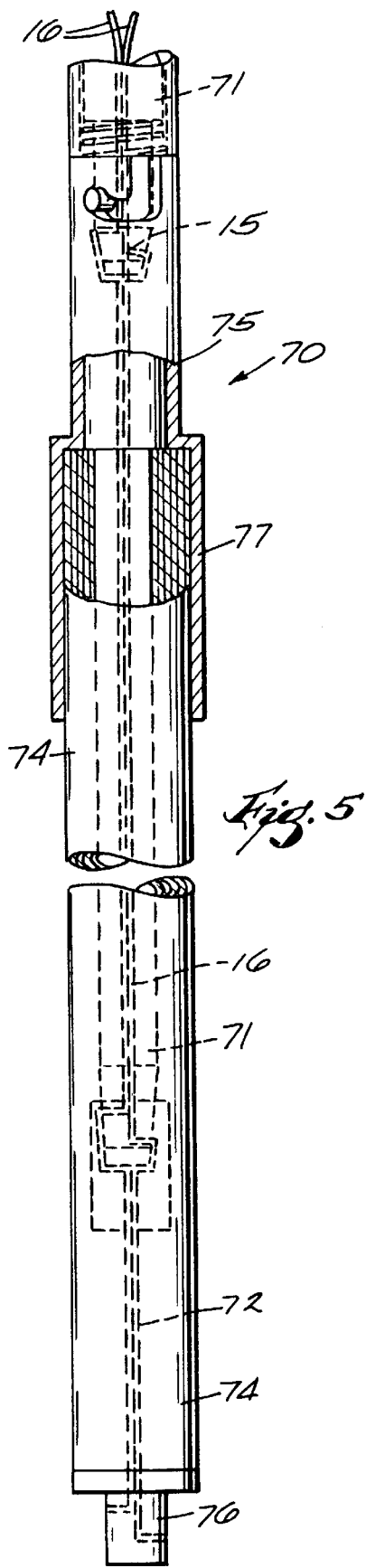
Fig. 5
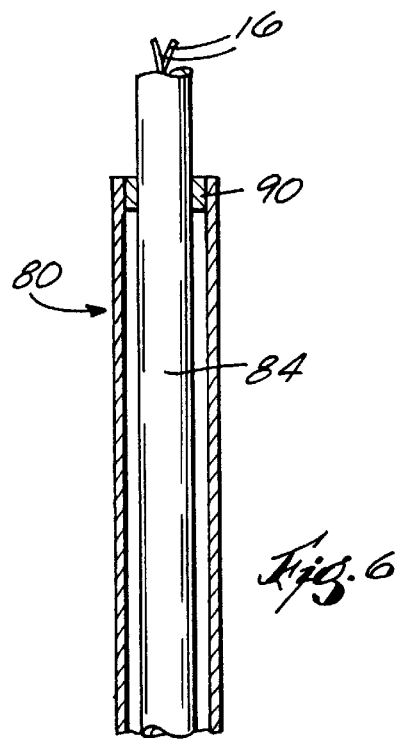
Fig. 6
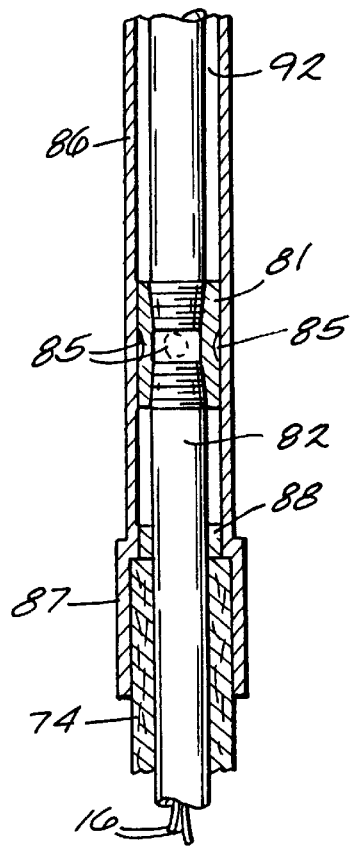

5,975,755

SHIELD FOR MOLTEN METAL IMMERSIBLE THERMOCOUPLE SUPPORT POLE

BACKGROUND OF THE INVENTION

This invention relates to measurement of temperatures in molten metal baths. More specifically the invention relates to a protective assembly for a support pole system for a temperature measuring thermocouple particularly adapted for use in molten metals.

Thermocouples or similar immersible temperature measuring devices are conventionally immersed in a molten metal bath in a metal processing vessel in order to measure the temperature and to control the process conditions such as the heat being supplied. It is desirable that such immersible thermocouple support poles are protected from excessive heat in order to extend the functional service life of signal carrying wires contained therein. Such molten metal containing vessels are used, for example, in refining of steel, iron, aluminum, copper, brass or bronze. It is also important that the support assemblies be easy to use and economical.

It is conventional to use cardboard tubes attached to the thermocouples to protect a hollow metal pole wherein insulated electrical wires, connected by means of appropriate electrical connectors to the immersible thermocouple, are concealed. Excessive exposure to heat significantly shortens the life of the thermocouple support assemblies. Operating conditions are typically are in the 2600° F. range in a foundry and 3100° F. in a steel shop.

Cardboard protective tubes are expendable but create undesirable air and metal pollution. Over a period of time, such tubes also add an undesirable expense to the metal processing procedure. Thus, a need has existed for improved heat-shielded support systems for both single use and reusable thermocouples.

SUMMARY OF THE INVENTION

It is a principal object of the invention to provide an improved protective device for thermocouples support systems for thermocouples intended for immersion in metallic baths such as steel, aluminum, copper or alloys of the same. In accordance with an important aspect of the invention the protective device includes cost reducing features such as providing of added protection for cardboard tubes and the feasibility of reduction of the length of such cardboard tubes.

In accordance with a related aspect, the invention provides a protective system for thermocouple support assemblies which provides a long lifespan over repeated usage of the "permanent" components of the system as well as semi-permanent components which are provided with improved lifespans.

In accordance with an important aspect of the invention, an improved tubular heat shield is provided for protection of thermocouple support assemblies, including a central hollow metal support pole, signal wires carried within the hollow pole, and cardboard sleeves affixed to the thermocouple which extend over and surround the lower extremity of the pole. In accordance with customary practice, a heat resistant, dimensionally stable refractory fiber protective layer surrounds most of the thermocouple as well as the lowermost end of the cardboard support tube. Plug-in electrical connectors are provided in the support assembly to enable quick changes of components, when required.

In accordance with a related aspect of the invention, the tubular heat shield is provided with means for spacing it radially away from the support pole a uniform distance, thereby forming an air space between the pole and the shield. In a preferred embodiment, the spacer is in the form of a metallic ring or annulus fixed to the interior of the tubular shield.

Briefly, the invention provides a protective device for support poles used to support a thermocouple for immersion into a molten metal bath to measure the temperature in the bath. The protective device includes an elongated tubular exterior shield, preferably metallic. An interior spacing member is contained within or otherwise affixed to the shield. The spacing member may be in inset from the lower end of the shield to accommodate insertion of an end of a cardboard tube into the annular space between the thermocouple support pole and the shield. A thermocouple for measuring temperatures in a molten metal bath is affixed to the hollow cardboard tube and electrically connected to signal wires contained within the support pole. The shield may be provided with threaded holes, preferably also extending through the spacing member, to receive set screws so that the shield may be fixed at a desired location along the length of the pole.

Further aspects and advantages of the invention will be set forth in the following detailed description and claims and with reference to the accompanying drawings.

BRIEF DESCRIPTION OF THE DRAWINGS

FIG. 1 is a frontal elevational view with parts in section showing the invention in conjunction with a fragmentarily illustrated molten metal bath;

FIG. 2 is a cross sectional view taken along line 2—2 of FIG. 1;

FIG. 3 is a frontal elevational view with parts in cross section showing a further embodiment of the invention;

FIG. 4 is a frontal elevational view with parts in cross section showing yet another embodiment of the invention;

FIG. 5 is a front elevational view with parts in cross section showing a further embodiment of the invention;

FIG. 6 is a central sectional view of a further modification of the device of FIG. 5, and FIG. 7 is a perspective view of an electrical plug male connector.

DETAILED DESCRIPTION OF INVENTION

Referring more specifically to the drawings, there is seen in FIG. 1 an immersible temperature monitoring probe device or thermocouple assembly 10. Probe 10 is adapted for immersion into a molten metal bath such as molten steel 11 (shown in fragmentary style) contained in a suitable vessel. In practice, the vessel may be any molten metal processing vessel or container within which the molten metal temperature is monitored. Thermocouple assembly 10 includes a conventional thermocouple 12 having a quartz tubular tip portion 13 in accordance with conventional design. Thermocouple 12 is supported on a hollow metal pole 14 which has a plug-in type of connector 15 adapted to interfit with a mating connector on the base of thermocouple 12. Probe 10 includes a protective elongated, generally tubular body 17 formed preferably of a fibrous refractory material bound together with a heat resistant binder such as a colloidal ammonium stabilized silica dispersion (commercially available, for example from Nalco Chemical Company under the trade designation Nalco® 2327).

Connector 15 is attached to electrical signal wires 16 carried within the hollow interior of pole 14 as seen in FIGS.

1 and 2. A protective cardboard tube 18 is also generally embedded in the upper end of the thermocouple assembly 12.

A protective shield 20 of this invention fits slidably over the exterior of support pole 14. Shield 20 includes a tubular metallic shield body 22 having an inside diameter large enough to fit around the outside diameter of cardboard tube 18. Washers or rings 24 and 26 are affixed to the interior of metal shield 22. Rings 24 and 26 have an opening at the center thereof of sufficient diameter to allow sliding placement therein of the exterior of pole 14. Thus rings 24 and 26 together with metallic shield body 22 form a confined or "dead" airspace 23 within the interior thereof. Note that air can flow neither radially or axially out of this air space which, thus, forms a protective insulating layer around pole 14. Rings 24 and 26 maybe welded or crimped to the interior of the shield body 22 or otherwise affixed thereto by means of mechanical fasteners such as set screws or rivets.

At least one of the rings 24 and 26 is provided with threaded apertures 28 adapted to threadably receive set screws or bolts 30. Set screws 30 can be used to fix shield 20 at a desired location along the length of pole 14.

Connector 15 is shown in greater detail in FIG. 6 wherein a typical male connector component is illustrated. Conductive rings 30 and 32 are connected to the wires 16 which are each connected to one of the wires 16. Ring conductors 32 are separated by insulator 34. The mating female receptacle at the upper end of thermocouple 12 is provided with electrical contacts adapted to contact rings 30 and 32, respectively. The body portion 36 of connector 15 is fitted within the body of pipe 14. The connectors themselves provide a sufficient friction fit to generally hold the thermocouple 12 on the end of metal pole 14.

In the alternative embodiment of FIG. 3, a longer cardboard tube 18A may be used. The upper end of tube 18A is protected by metallic sleeve 22, as illustrated. The ring 24 affixed within sleeve 22 abuts against the upper end of cardboard tube 18A.

The embodiment of FIG. 3 is also used in a situation wherein a relatively low temperature within the molten metal bath is being measured. In either case significantly greater protection of tube 18 or 18A is afforded, thus eliminating significant smoldering of cardboard when the thermocouple 10 is in use. The versions of FIGS. 1 and 3 are most suitable in situations wherein metallic bath 11 does not have a slag layer of consequence. This is due to the fact that quartz tube 13 is not protected by a slag cover in the illustrated embodiments.

FIG. 4 shows an alternative embodiment of the invention having a thermocouple assembly 40 which includes a thermocouple 42 protected by a conventional slag cover 44. Thermocouple assembly 40 also is supported on a metallic pipe 46. The body of the thermocouple and lower end of interior wires 50 are protected by a fiber ceramic material 47. Thermocouple assembly 40 is intended for use in baths having a floating slag layer and utilizing higher temperatures. Electrical lead wires 50 are connected to couplings 15 of the type previously described.

A threaded fitting 52 is provided at the lower end of a permanent supporting lance assembly (not shown). Threaded member 52 is threadably coupled to a nut 56 affixed by welding to a centrally hollow ring member 60 which in turn is connected to a protective sleeve 58. Sleeve 58 has an interior diameter adapted to slide over the upper end of cardboard tube 48. Cardboard tube 48 abuts against the bottom of a ring 51 which is affixed to the interior of shield 58 approximately 1 inch from the lower end thereof. Ring 51 has a central opening having a diameter large enough to allow passage of pipe 46 therethrough. Shield 58, thus, is an integral part of the threaded member 56. Thus, the configuration of FIG. 4 is particularly useful in situations where shielding of a gap between the upper end of cardboard tube 48 and the connection to a permanent support tube component is needed.

Referring to FIGS. 5 and 6 there are shown further embodiments of the invention useful in extremely high temperature molten metal temperature measurements and wherein a slag layer is often encountered. The embodiments of FIGS. 5 and 6 include shields 70 and 80 both of which are intended to protect the pipes in which wire 16 are contained. Shield 70 is adapted to protect pipe 71 and the upper end of a long cardboard tube 74 within which a thermocouple 72 is contained. Such thermocouples are intended for use in very high temperature conditions and in conjunction with molten metal baths which have a floating layer of slag thereon. Thus a slag cap 76 is usually provided. Shield 70 includes a tubular body portion 75. Optionally, a flared section 77 maybe provided which is adapted to fit over the upper end of cardboard tube 74. A quick connect coupling or connector 15 can be utilized to permit replacement of the lower end of a tube assembly without the need for replacing the entire length thereof.

In the alternative version shown in FIG. 6, a metallic shield 80 includes, therewithin, a threaded connector 81 adapted to threadably receive pipe sections 82 and 84. Coupling 81 is preferably welded to the body 86 of shield 80 by means of spot welds 85. Again, a flared section 87 as shown is provided for the purpose of receiving the upper end of a cardboard tube 74. Rings 88 and 90 are also secured within the interior of tube 86 either by welding, crimping or similar means. The presence of rings 88 and 90 together with the body 86 of shield 80 create a dead air space 92 surrounding the pipe sections 82 and 84. Thus shield 80 provides very effective heat shielding of the metallic tubes 82 and 84 as well as the threaded joint 81. Spot welds 85 retain threaded coupling 81 in place within the body 86 of shield 80. The embodiment of FIG. 6 enables the replacement of pipe section 82 while allowing the continued use of section 84, in cases where only the lower section 82 has been subjected to deterioration. This enables a significant cost saving compared to previous devices while at the same time providing improved heat shielding. If, instead of a "dead" air space, it is desired that a longitudinal flow of cooling air is desired, it will be apparent that holes can be provided through the rings 24, 26 or 88, 90 to create suitable air flow channels.

As the term "refractory" is used herein, any high temperature resistant material know to the art is intended to be included. Examples include graphite, quartz, boron nitride, alumina, alumina graphite and similar materials known to those skilled in the art.

Since various thermocouples, such as chromel-alumel, etc. are well known to those familiar with the art, specific details thereof will not be described herein. Thus, the term "thermocouple" as used herein is intended to encompass any suitable temperature measuring device suitable for measuring temperatures of molten metal baths such as molten aluminum.

In addition to the foregoing preferred embodiments, various other modifications falling within the scope and spirit of the invention and true scope of the appended claims will be apparent to those skilled in the art.

I claim:

1. A protective device for a support assembly for a thermocouple adapted for immersion into a molten metal bath to measure the temperature in the bath comprising an elongated metallic support pole, the lower end of said pole being adapted to support a thermocouple which has a cardboard tube embedded in an end thereof, with said support pole having a first end extending within said cardboard tube, said thermocouple being adapted for measuring temperatures in a molten metal bath an elongated exterior protective tubular shield concentric with and surrounding said support pole, said shield having a lower end fitted over said first end of said cardboard tube, said shield further comprising a spacing member affixed to the shield, the spacing member being adapted to maintain an annular space between said support pole and the shield.

2. A device according to claim 1 wherein said shield comprises a metallic material.

3. A protective device according to claim 1 wherein said spacing member is contained within and affixed within the interior of said shield.

4. A protective tubular device according to claim 2 wherein said spacing member is inset from the lower end of the shield to accommodate insertion of an end of said cardboard tube into an annular space between the pole and the shield.

5. A device according to claim 4 further comprising a thermocouple for measuring temperatures in a molten metal bath affixed to the hollow cardboard tube.

6. A protective tubular device for a thermocouple according to claim 3 wherein the shield is provided with threaded holes to receive set screws so that the shield may be fixed at a desired location along the length of the pole.

7. A device according to claim 6 wherein said threaded holes also extend through the spacing member.

8. A device according to claim 7 comprising at least two spacing members in the form of metallic rings having exterior diameters approximately equal to the interior diameter of said tubular shield, said rings being welded to said shield.

9. A device according to claim 8 wherein a spacing member located within and affixed to said shield is provided with threads centered on a longitudinal axis of said shield, said threads being adapted to receive a threaded end of a section of said support pole, whereby said device can be used to couple together sections of said support pole.

* * * * *